US011402176B2

(12) United States Patent
Maidanik et al.

(10) Patent No.: US 11,402,176 B2
(45) Date of Patent: *Aug. 2, 2022

(54) METHOD AND SYSTEM OF DETERMINING MISS-DISTANCE

(71) Applicant: ISRAEL AEROSPACE INDUSTRIES LTD., Lod (IL)

(72) Inventors: Michael Maidanik, Rehovot (IL); Oded M. Golan, Kfar Vradim (IL); Miki Livne, Rosh Ha'Ain (IL); Jacob Rovinsky, Modiin (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/340,852

(22) Filed: Jun. 7, 2021

(65) Prior Publication Data

US 2021/0310768 A1     Oct. 7, 2021

Related U.S. Application Data

(63) Continuation of application No. 16/472,757, filed as application No. PCT/IL2017/051380 on Dec. 24, 2017, now Pat. No. 11,054,220.

(30) Foreign Application Priority Data

Dec. 26, 2016  (IL) .......................... 249787

(51) Int. Cl.
*G06G 7/80*     (2006.01)
*F41G 7/00*     (2006.01)
*G06T 7/50*     (2017.01)
*G06T 7/70*     (2017.01)

(52) U.S. Cl.
CPC ................ *F41G 7/001* (2013.01); *G06T 7/50* (2017.01); *G06T 7/70* (2017.01)

(58) Field of Classification Search
CPC .............. F41G 7/001; G06T 7/50; G06T 7/70
USPC ...................................................... 235/404
See application file for complete search history.

(56) References Cited

U.S. PATENT DOCUMENTS

| | | | |
|---|---|---|---|
| 5,702,068 A | 12/1997 | Stoll et al. | |
| 6,125,308 A | 9/2000 | Hills et al. | |
| 6,535,816 B1 | 3/2003 | Smith | |
| 8,946,606 B1 | 2/2015 | Dennison et al. | |
| 2015/0219426 A1 | 8/2015 | Moraites et al. | |
| 2015/0310603 A1 | 10/2015 | Moraites et al. | |

FOREIGN PATENT DOCUMENTS

| | | |
|---|---|---|
| DE | 27 38 266 A1 | 3/1979 |
| GB | 2345952 A | 7/2000 |

*Primary Examiner* — Tuyen K Vo
(74) *Attorney, Agent, or Firm* — Oliff PLC

(57) ABSTRACT

The presently disclosed subject matter includes a computerized method and system for determining miss-distance between platforms. The proposed method and system make use of an electro optic sensor (e.g. camera) mounted on one of the platforms for obtaining additional data which is used for improving the accuracy of positioning data obtained from conventional positioning devices. A navigation error is calculated where the relative position of the two platforms is converted to the camera reference frame. Once the navigation error is available, it can be used to correct a measured miss-distance.

24 Claims, 7 Drawing Sheets

METHOD AND SYSTEM OF DETERMINING MISS-DISTANCE

CROSS-REFERENCE TO RELATED APPLICATIONS

This is a Continuation of application Ser. No. 16/472,757 filed Jun. 21, 2019, which is a National Stage Application of PCT/IL2017/051380 filed Dec. 24, 2017, which claims the benefit of Israel Patent Application No. 249787 filed Dec. 26, 2016. The disclosure of the prior applications is hereby incorporated by reference herein in its entirety.

FIELD OF THE PRESENTLY DISCLOSED SUBJECT MATTER

The presently disclosed subject matter relates to the computer-implemented determination of distance between platforms.

BACKGROUND

In various applications it is desired to determine the distance (relative position) between two platforms while one platform passes by the other platform or while both platforms pass, one by the other. Normally, this distance is determined based on the comparison of navigation data received from conventional positioning devices such as GNSS and/or INS, installed onboard the two platforms.

GENERAL DESCRIPTION

The term "miss-distance" is used herein to refer to the shortest distance which was reached between two platforms in a scenario where one platform passes by another stationary platform, or where the two platforms are in motion and pass one by the other. In the event of impact, miss-distance equals zero, otherwise miss-distance equals a value greater than zero. The term "miss-distance time (4)" refers to a point in time in which the miss-distance occurred.

One example where it is desired to calculate the miss-distance is for the purpose of determining the accuracy of an intercepting airborne platform aimed to fly by a target (stationary target or moving target). For instance, when an intercepting airborne platform such as a missile is being tested, it is sometimes preferred to avoid direct impact of the intercepting platform on the target. Calculating the miss-distance provides an alternative to target interception. This alternative enables to reduce testing costs as the target is not destroyed and can be reused more than once. Also, this approach assists when destruction of the target is not permitted for safety reasons (e.g. where impact between the intercepting platform and the target occurs over a populated area). Furthermore, determining the miss-distance may also be required for debriefing purposes, in cases where the intercepting platform was aimed to hit the target, but failed to do so.

As mentioned above, conventional methods of calculating miss-distance are based on the comparison of navigation data received from positioning devices onboard the platforms. The accuracy of miss-distance calculation performed by conventional techniques suffers from inaccuracies resulting from the inherent inaccuracies of the measurements received from positioning devices (e.g. GNSS receivers).

The presently disclosed subject matter includes a computerized method and system for determining miss-distance between platforms. The proposed method and system make use of an electro optic sensor (e.g. camera) mounted on one of the platforms for obtaining additional data which is used for improving the accuracy of positioning data obtained from conventional positioning devices.

More specifically, initially, a navigation error is calculated where the relative position of the two platforms is converted to the camera reference frame. Inaccuracies in this calculation are determined, based on the camera data in the focal-plane array (FPA) plane. The error is expressed in the camera X, Y and Z axes where Y and Z are in the camera image plane and X is perpendicular to that plane.

Now that the navigation error is available, it can be used to correct the measured miss-distance. A relative position is calculated at the miss-distance time, based on the onboard navigation systems. The relative position is corrected using the calculated navigation error value to obtain a more accurate value.

According to an aspect of the presently disclosed subject matter there is provided a computer implemented method of determining miss-distance between an intercepting platform and a target platform; the intercepting platform is launched towards the target platform and comprises a camera and at least one positioning device; the method comprising using at least one processor for:

i. executing a navigation errors calculation process, comprising:

for at least one image captured by the camera at a time $t_{Fi}$ during flight of the intercepting platform towards the target platform:

calculating relative position of the intercepting platform and the target platform, based on navigation data of the intercepting platform determined by the at least one positioning device and navigation data of the target platform;

transforming the relative position to camera field of view (CFOV) reference frame;

calculating rectified relative position values in the camera Y and Z components, based on the relative position in camera field of view reference frame and camera line of sight (CLOS) unit vector components; and calculating relative position error values in the Y and Z axes in the FPA of the camera, based on a difference between the relative position and rectified relative position values;

ii. executing a navigation miss-distance correction process, comprising:

determining relative position of the intercepting platform and target platform at miss-distance time; and correcting relative position using the relative position error values.

In addition to the above features, the method according to this aspect of the presently disclosed subject matter can optionally comprise one or more of features (a) to (h) below, in any technically possible combination or permutation:

a) wherein executing a navigation errors calculation process further comprises:

for each captured image at time $t_{Fi}$:

utilizing the at least one positioning device for determining navigation data of the intercepting platform;

calculating attitude of the camera onboard the intercepting platform, in the reference frame of the intercepting platform;

applying image processing on the captured image for determining CLOS; and transforming relative position to CFOV reference frame.

b) wherein executing a navigation errors calculation process further comprises:

capturing multiple images and calculating respective relative position error values, wherein each respective relative position error value is associated with a certain captured image.

c) The method further comprising: calculating final position error values based on the respective relative position error values.

d) The method further comprising attitude errors determining process, comprising:

selecting a first image at time $t_{F1}$ and a second image at time $t_{F2}$;

for each one of the first image and second image:

determining relative position in the CFOV reference frame;

calculating rectified relative position values in the camera Y and Z axes;

using LOS component $u_Y$ and $u_Z$ at $t_{F1}$ and $t_{F2}$ to compute angle errors;

e) The method further comprising synchronizing clocks onboard the intercepting platform and the target platform.

f) The method further comprising determining whether one or more termination conditions have been fulfilled, and terminating navigation errors calculation process if they have.

g) The method further comprising identifying miss-distance time.

h) wherein calculating attitude of the camera and calculating CLOS are executed on any one of the intercepting platform and a control station.

According to another aspect of the present disclosed subject matter there is provided a computerized device configured for determining miss-distance between an intercepting platform and a target platform; the intercepting platform is launched towards the target platform and comprises a camera and at least one positioning device; the computerized device comprising at least one processor configured to:

i. execute a navigation errors calculation process, comprising:

for at least one image captured by the camera at a time $t_{Fi}$ during flight of the intercepting platform towards the target platform:

calculate relative position of the intercepting platform and the target platform, based on navigation data of the intercepting platform determined by the at least one positioning device and navigation data of the target platform;

transform the relative position to camera field of view (CFOV) reference frame;

calculate rectified relative position values in the camera Y and Z components, based on the relative position in camera field of view reference frame and camera line of sight (CLOS) unit vector components; and calculate relative position error values in the Y and Z axes in the FPA of the camera, based on a difference between the relative position and rectified relative position values;

ii. execute a navigation miss-distance correction process, comprising:

determine relative position $t_I$ of the intercepting platform and target platform at miss-distance time $t_f$; and correct relative position $t_I$ using the relative position error values.

According to another aspect of the presently disclosed subject matter there is provided a system for determining miss-distance between an intercepting platform and a target platform; the system comprising a control station, an intercepting platform and a target platform; the intercepting platform is launched towards the target platform and comprises a camera and at least one positioning device; the system further comprises a computerized device configured to:

i. execute a navigation errors calculation process, comprising:

operate the camera for capturing at least one image of the target platform; wherein each image is associated with a respective time $t_{Fi}$;

the computerized device is configured, for each captured image at time $t_{Fi}$, to:

utilize the at least one positioning device for determining navigation data of the intercepting platform;

calculate attitude of the camera onboard the intercepting platform, in the reference frame of the intercepting platform;

apply image processing on the captured image for determining CLOS;

transform relative position to CFOV reference frame;

calculate relative position of the intercepting platform and the target platform, based on navigation data of the intercepting platform determined by the at least one positioning device and navigation data of the target platform;

transform the relative position to camera field of view (CFOV) reference frame;

calculate rectified relative position values in the camera Y and Z components, based on the relative position in camera field of view reference frame and camera line of sight (CLOS) unit vector components; and calculate relative position error values in the Y and Z axes in the FPA of the camera, based on a difference between the relative position and rectified relative position values;

ii. execute a navigation miss-distance correction process, comprising:

determine relative position $t_I$ of the intercepting platform and target platform at miss-distance time $t_f$; and correct relative position $t_I$ using the relative position error values.

According to another aspect of the presently disclosed subject matter there is provided a non-transitory program storage device readable by a computer, tangibly embodying a program of instructions executable by the computer to perform a method of determining miss-distance between an intercepting platform and a target platform; the method comprising:

i. executing a navigation errors calculation process, comprising:

for at least one image captured by the camera at a time $t_{Fi}$ during flight of the intercepting platform towards the target platform:

calculating relative position of the intercepting platform and the target platform, based on navigation data of the intercepting platform determined by the at least one positioning device and navigation data of the target platform;

transforming the relative position to camera field of view (CFOV) reference frame;

calculating rectified relative position values in the camera Y and Z components, based on the relative position in camera field of view reference frame and camera line of sight (CLOS) unit vector components; and calculating relative position error values in the Y and Z axes in the FPA of the camera, based on a difference between the relative position and rectified relative position values;

ii. executing a navigation miss-distance correction process, comprising:
    determining relative position $t_I$ of the intercepting platform and target platform at miss-distance time $t_f$; and
    correcting relative position $t_I$ using the relative position error values.

The computer device, the system and the program storage device, disclosed in accordance with the presently disclosed subject matter can optionally comprise one or more of features (a) to (h) listed above, mutatis mutandis, in any desired combination or permutation.

The presently disclosed subject matter further contemplate a system and method for maintaining a minimal distance between platforms in order to avoid impact between the platforms. The same principles mentioned above and described in detail below are used for calculating the miss-distance between two platforms (either two moving platforms or a moving platform and a stationary platform). According to this implementation, it is desired to maintain one platform within a certain predefined distance from the other platform. If the distance between the platforms is closer than the predefined minimal distance, maneuvering instructions to one or both of the platforms are generated (e.g. by computer 20) for controlling flight control subsystems onboard the platform and directing the platforms to avoid impact.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1A:
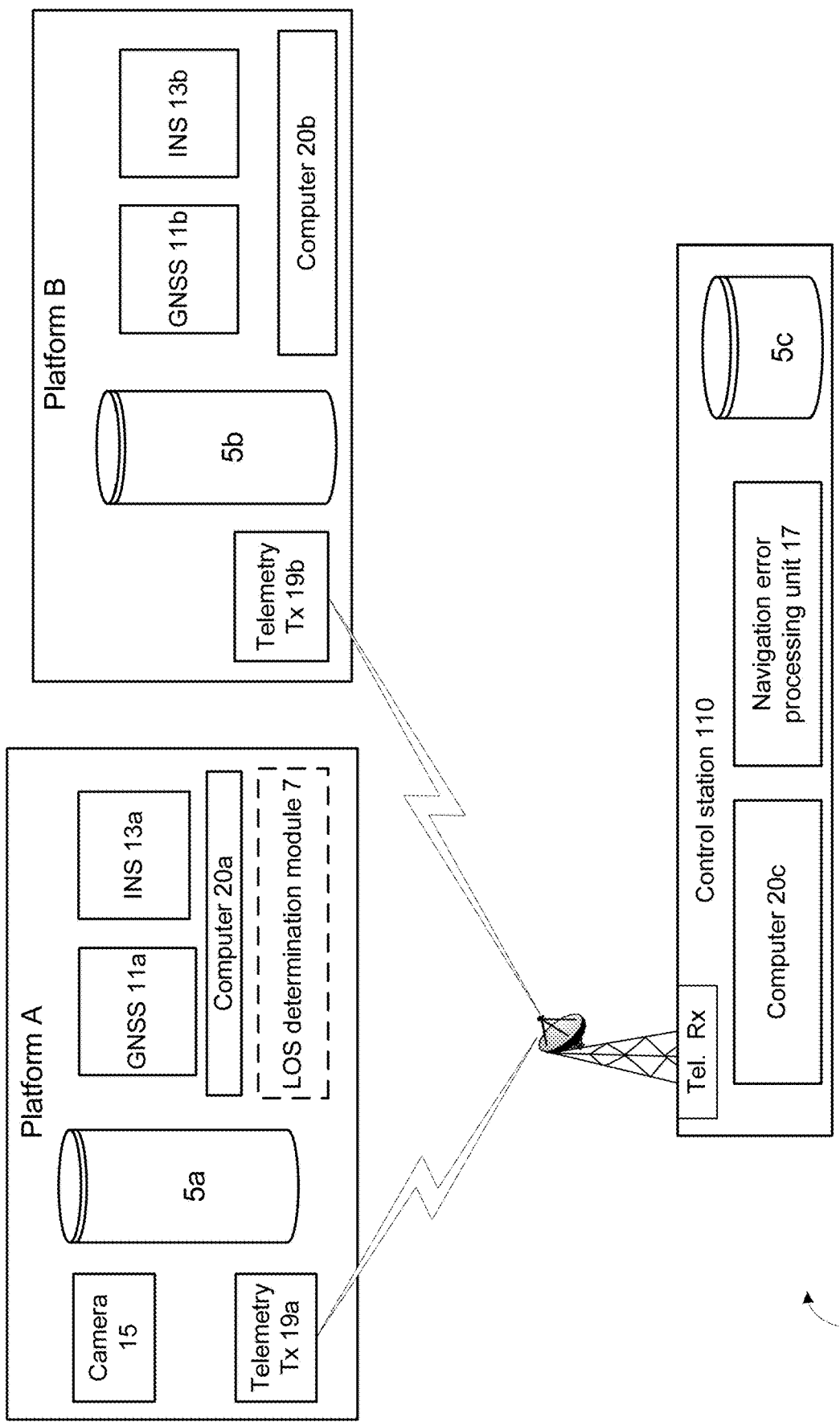
FIG. 1*a* is a functional block diagram of a system, in accordance with an example of the presently disclosed subject matter.

In the drawings and descriptions set forth, identical reference numerals indicate those components that are common to different embodiments or configurations. Elements in the drawings are not necessarily drawn to scale.

Unless specifically stated otherwise, as apparent from the following discussions, it is appreciated that throughout the specification discussions utilizing terms such as "executing", "calculating", "transforming", "applying", "determining" or the like, include action and/or processes of a computer that manipulate and/or transform data into other data, said data represented as physical quantities, e.g. such as electronic quantities, and/or said data representing the physical objects.

The terms "computer", "computerized device" or the like, should be expansively construed to cover any kind of electronic device with data processing circuitry, including a processor (e.g. digital signal processor (DSP), a microcontroller, a field programmable gate array (FPGA), an application specific integrated circuit (ASIC), etc.) or any other electronic device or combination thereof comprising one or more processors providing the device with data processing capabilities.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

In embodiments of the presently disclosed subject matter, fewer, more and/or different stages than those shown in FIGS. 3*a*, 3*b*, 4 and 5 may be executed. In embodiments of the presently disclosed subject matter one or more stages illustrated in FIGS. 3*a*, 3*b*, 4 and 5 may be executed in a different order and/or one or more groups of stages may be executed simultaneously.

Figure 1B:
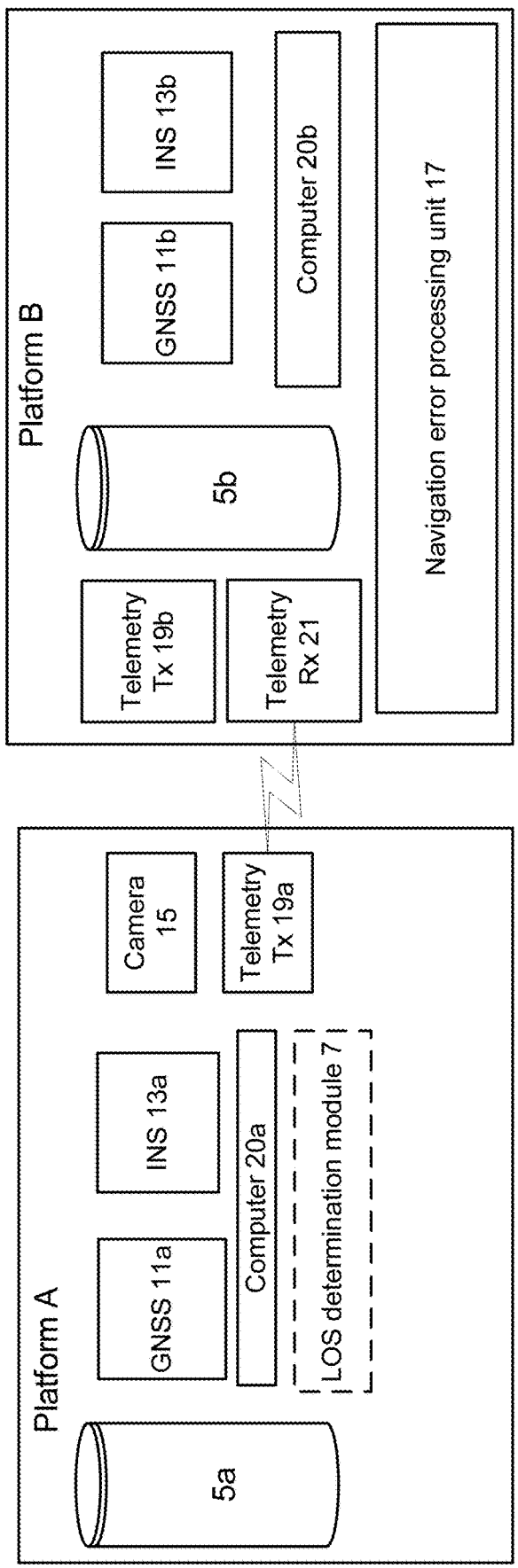
FIG. 1*b* is a functional block diagram a system, in accordance with another example of the presently disclosed subject matter.
Figure 2:
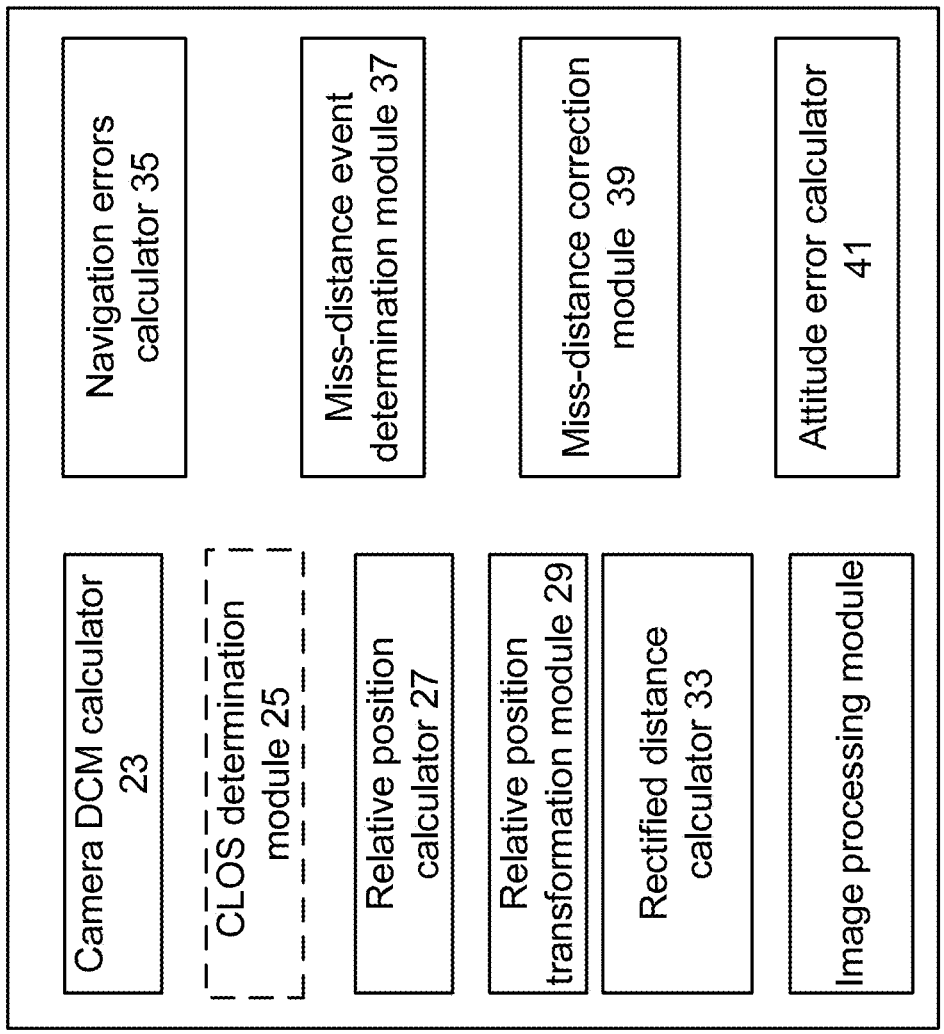
FIG. 2 is a functional block diagram of a navigation error correction unit, in accordance with an example of the presently disclosed subject matter.

FIGS. 1*a*, 1*b* and 2 illustrate a general schematic of the functional layout of the system architecture in accordance with examples of the presently disclosed subject matter. Elements in FIGS. 1*a*, 1*b* and 2 can be made up of any combination of software and hardware and/or firmware that performs the functions as defined and explained herein. Elements in FIGS. 1*a*, 1*b* and 2 can be in some examples centralized in one location and in other examples dispersed over more than one location. In other examples of the presently disclosed subject matter, the system may comprise fewer, more, and/or different elements than those shown in FIGS. 1*a*, 1*b* and 2. For example, while navigation error processing unit 17 is described herein to be configured to calculate both the navigation errors and also correct the miss-distance, in other examples, these two functions can be assigned to two different units, physically separated, where one unit is configured to calculate navigation errors and the other unit is configured to use the calculated navigation errors for correcting measured miss-distance.

Attention is now drawn to FIG. 1*a* showing a functional block diagram of a system configured to calculate miss-distance, according to an example of the presently disclosed subject matter. Platform A schematically represents various types of airborne vehicles which are capable of being directed to fly towards a target. Platform A can be for example, an aircraft, a missile, a rocket, or some other projectile. In some examples, platform B can also be an airborne vehicle as platform A or some other moving or stationary target. For instance, platform A can be an intercepting missile targeting another missile or an aircraft, represented by platform B. In other examples, platform B can be a stationary or mobile object which is not airborne. For instance, platform A can be a missile and platform B a stationary target of some kind.

Platform A comprises: computer 20*a*; positioning devices including for example GNSS device 11*a* and INS 13*a* device; an electro optic sensor (referred to herein below as a "camera") 15*a* (e.g. CCD or CMOS camera device); and telemetry transmitter (Tx) 19*a*; and computer data-storage 5*a*. Platform B comprises: computer 20*b*; positioning devices including for example GNSS device 11*b* and INS 13*b* device; telemetry transmitter (Tx) 19*b*; and computer data-storage 5*b*.

According to the illustrated example, system 100 further comprises control station 110 configured to communicate over a communication network with platform A and platform B. Control station 110 comprises navigation error processing unit 17 operatively connected to computer 20*c*. Control station 110 can be located anywhere possible including the ground and a vehicle such as an aircraft, satellite, a marine vessel or a ground vehicle.

Control station 110 is configured in general to receive telemetry data (via telemetry receiver Rx) from telemetry Tx 19*a* on platform A and telemetry Tx 19*b* on platform B. The received telemetry data is fed to navigation error processing unit 17 which is configured in turn to use the received telemetry data for determining navigation error. According to some examples, unit 17 is further configured to use the calculated navigation error for correcting the navigation data received from the positioning devices and determining a more accurate miss-distance.

Computer (20*a*/20*b*/20*c*) on platform A, platform B and control station, respectively, schematically represent one or more computer processing devices operating on the respective platform, which are configured to execute various operations such as operations executed by positioning devices, telemetry, camera and navigation error correction unit.

Notably, according to the illustrated example, only platform A comprises camera 15, however, in some examples, platform A and platform B may both comprise the same components enabling to calculate the navigation error based on data received from both platforms.

According to another example (illustrated in FIG. 1*b*), navigation error processing unit 17 can be located onboard platform B. According to this example, platform B is configured to receive telemetry data (by telemetry Rx 21) from platform A and feed to unit 17 data generated onboard platform B as well as telemetry data generated by platform A. As in the previous example, unit 17 is configured to use generated data and received telemetry data for determining navigation error, use the calculated navigation error for correcting the navigation data received from the positioning devices, and determine a more accurate miss-distance. According to other examples, unit 17 is located on platform A. According to some examples, both platform A and platform B can be similarly equipped (also with a camera) and configured to determine navigation error and correct the measured miss-distance.

It is noted that FIGS. 1*a* and 1*b* are functional block diagrams showing only functional components which are relevant to the presently disclosed subject matter. In reality, platform A, platform B and control station 110 comprise many other components related to other functionalities of the platforms (e.g. structural subsystem, propelling system, flight control unit, power source, various sensors, etc.) which are not described for the sake of simplicity and brevity.

FIG. 2 is a functional block diagram of various functional components of navigation error processing unit 17, in accordance with an example of the presently disclosed subject matter. A more detailed description of components in FIG. 2 is provided below.

Figure 3A:
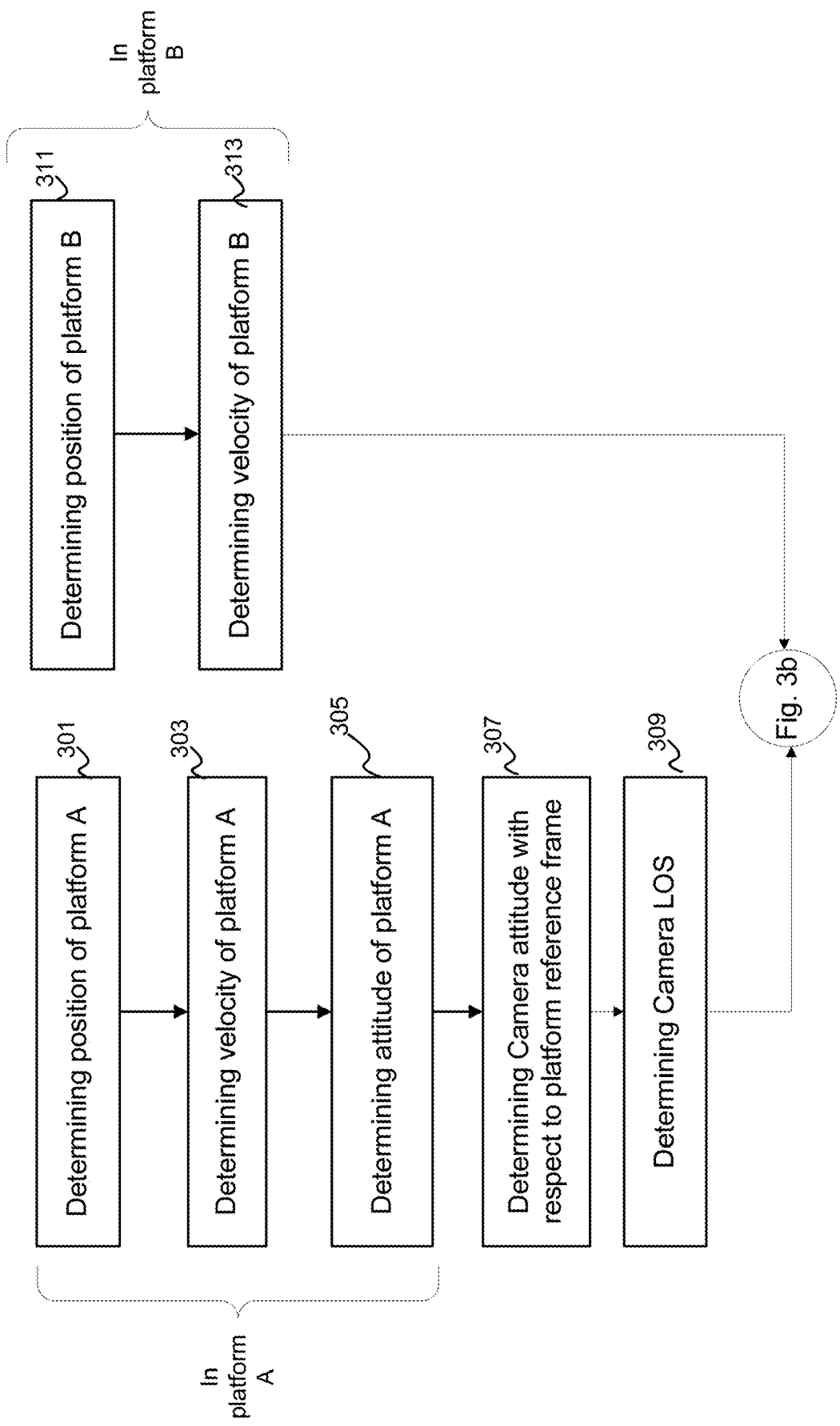
FIG. 3*a* is a flowchart illustrating operations related to a navigation errors calculation process, in accordance with an example of the presently disclosed subject matter.

FIG. 3*a* is a flowchart illustrating operations related to the navigation errors calculation process, in accordance with an example of the presently disclosed subject matter. Operations described with reference to FIG. 3*a* can be executed, for example, with the help of system 100 described above with reference to FIGS. 1*a* and 1*b*. It is noted however that any description of operations in FIG. 3*a* (as well as FIGS. 3*b*, 4 and 5) which is made with reference to elements in FIGS. 1*a*, 1*b* and 2 is done by way of example and for the purpose of illustration only and should not be construed as limiting in any way.

Operations described with reference to blocks 301 to 305 are executed onboard platform A and operations described with reference to block 311 to 313 are executed onboard platform B. Operations described with reference to blocks 307 to 309 can be executed onboard platform A (the platform operating the camera), or, alternatively, by some other device located elsewhere (e.g. navigation error processing unit 17 located on control station 110) where the required data from platforms A and B is available.

In general, platform A is directed either to intercept platform B, or to fly by platform B, at a certain distance. Platform A may have a propelling system, an onboard navigation and flight control systems, and accordingly may be capable, either autonomously or responsive to instructions received in real-time, to direct itself towards a designated target. In other examples, platform A may be a projectile thrown into space, primarily propelled by the initial thrust gained during launch, and there may be little or no ability to control its flight path once in the air. In such cases, accuracy of hitting the target mainly depends on the trajectory calculations and aiming to target made before launch.

In any case, unit 17 (configured for example as part of control station 110 or platform B or platform A) is configured to determine a miss-distance between platform A and platform B. The miss-distance is calculated, based on GNSS and INS navigation data and calculated navigation error. Where platform A is directed to hit platform B, the miss-distance can be calculated and provided in case platform A misses the target, (in case of a direct hit on the target the calculated miss-distance is expected to be zero).

During flight of platform A towards platform B, navigation data including the position and velocity of platform A are determined (blocks 301, 303). Navigation data can be determined with respect to Earth Centered Earth-Fixed (ECEF) or any other appropriate reference frame. Determination of position and velocity can be accomplished with the help of positioning devices onboard platform A. Navigation data further comprises the attitude of platform A, which is also determined during flight of the platform (block 305). Attitude can be determined with respect to the relevant reference frame (e.g. Direction Cosine Matrix (DCM) of Body relative to ECEF). Determination of attitude can be accomplished for example, with the help of INS 13*a* onboard platform A.

As mentioned above, platform A also comprises an onboard camera 15. Camera 15 can be attached to platform A at a fixed angle, or may be attached by a gimbal system. Camera 15 can be positioned for example around the front end of platform A and can be operated during flight of platform A for capturing images of platform B.

During flight of platform A, towards platform B, the attitude (in the defined reference frame) of camera 15 with respect to platform A is also determined (block 307). Attitude of the camera with respect to the predefined reference frame can be calculated, based on the attitude of the platform calculated above and the attitude of the camera with respect to the platform.

In case camera 15 is attached to platform A at a fixed angle, the camera attitude with respect to the platform can be predefined. In case camera 15 is attached to platform A by gimbals, the camera attitude can be calculated, based on the gimbals system data (including for example gimbal angles).

Camera attitude data with respect to platform A is transformed to camera attitude with respect to the reference frame. This can be performed, based on the platform's attitude in the reference frame and camera attitude with respect to the platform, for example by the multiplication of DCM values. See for example the mathematical representation in section A in annex 1 below, which is considered as part of this description. Camera DCM can be computed for example by camera DCM calculator 23 in navigation error processing unit 17.

At block 309 camera line of sight (CLOS) vector from camera to platform B is determined. CLOS can be calculated for example, based on pixels in the camera sensors which are exposed to platform B (pixels receiving light reflected from platform B). As platform A approaches platform B, camera 15 captures images. Image processing is applied to images captured by the camera for identifying platform B in the frame. The pixels exposed to platform B are identified within camera field of view (CFOV) and unit vector components ($u_Y$, $u_Z$, defined below) from the camera in the direction of platform B in the camera focal-plane array (FPA) plane are obtained.

According to one example, CLOS can be determined onboard platform A (e.g. by CLOS determination module 25 onboard platform A, which can include an image processor, and be configured to execute the relevant image processing). According to another example, captured images can be transmitted (e.g. via telemetry unit 19a) to control station 110, where the CLOS can be calculated (e.g. by CLOS determination module 25 in navigation error processing unit 17).

In addition, on platform B, during flight of platform A towards platform B, navigation data including the position and velocity of platform B are determined (blocks 311, 313). Similar to platform A, navigation data can be determined with respect to Earth-Centered Earth-Fixed (ECEF) or any other predefined reference frame.

Determination of position and velocity can be accomplished for example with the help of positioning devices (e.g. GNSS 11b and/or INS 13b). Of course, if platform B is stationary, velocity is 0, and the determination of its position can be determined once and/or provided once to unit 17. In such cases, positioning devices onboard platform B may not be necessary.

Figure 3B:
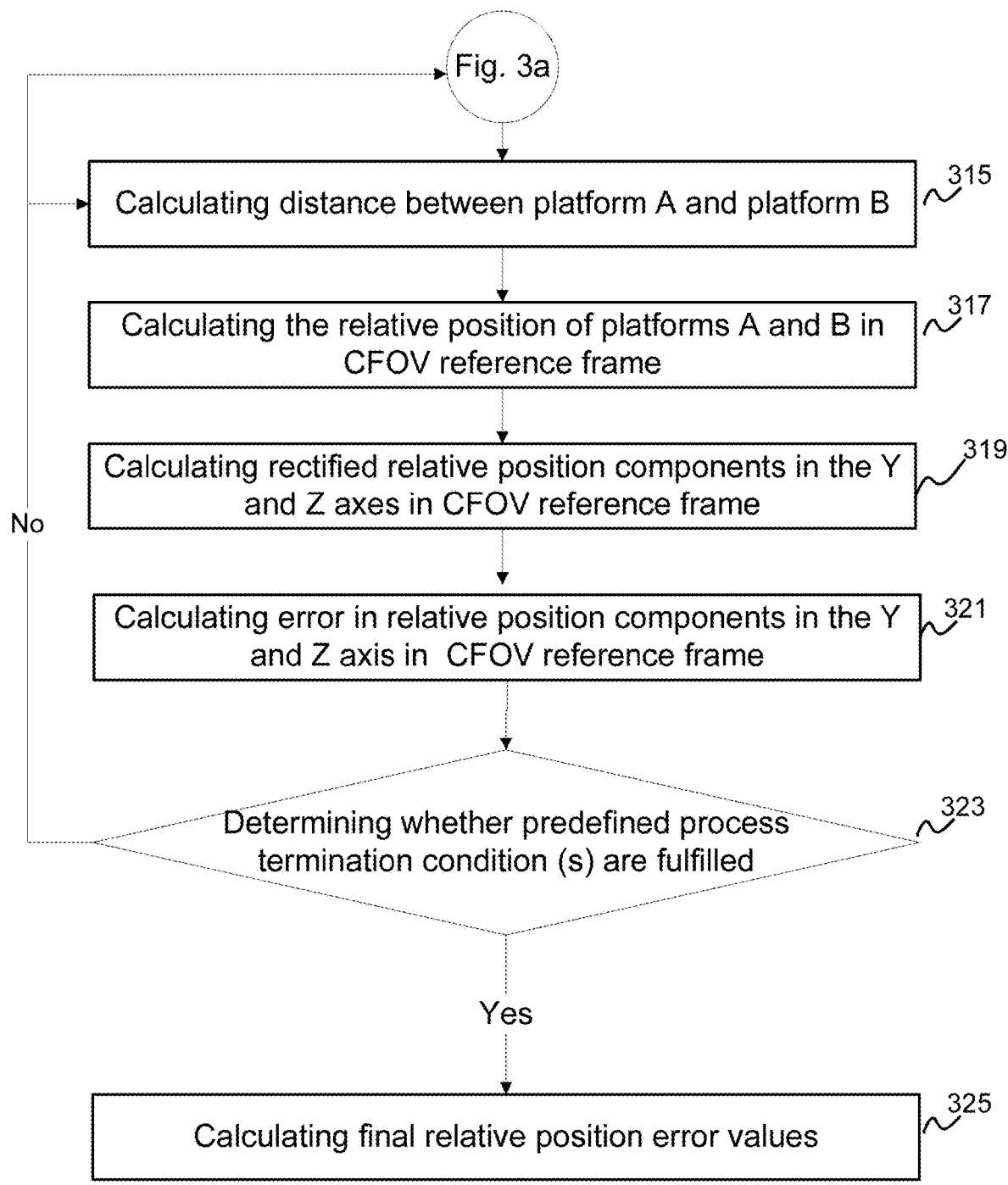
FIG. 3*b* is a flowchart illustrating operations related to a navigation errors calculation process, in accordance with an example of the presently disclosed subject matter.

As explained below, depending on the specific implementation of the process, the calculations described above with reference to FIG. 3a can be performed once, or repeated multiple times. In any case, these calculations, as well as those described below with reference to FIG. 3b, are synchronized with a certain image captured by the camera. Accordingly, position and velocity of the platforms, as well as camera attitude, camera LOS or its components, are tagged with a time stamp of a respective captured image ($t_{Fi}$, where i=1, 2, . . . N). If the calculations described with reference to FIGS. 3a and 3b are repeated, each repetition of the calculations is executed with respect to a corresponding captured image. Values calculated at the time of certain captured image $t_{Fi}$ can be tagged with a time stamp or tag associating each value to that image.

Notably, time between the two platforms is synchronized. This can be accomplished for example, by synchronizing between clocks onboard the two platforms (e.g. GNSS clocks onboard platform A and platform B).

Turning to FIG. 3b, this shows a flowchart illustrating further operations related to the navigation errors calculation process, according to examples of the presently disclosed subject matter. Operations described with reference to FIG. 3b can be executed, for example, with the help of navigation error processing unit 17 described above.

For a given captured image $t_{Fi}$, a distance between platform A and platform B is calculated, based on the difference between the navigation data determined in the two platforms in the relevant time frame of the image (block 315). See for example mathematical representation in section B in the annex 1 below. According to one example, the distance can be calculated, for example, by relative position calculator 27 in unit 17.

At block 317 the distance between platform A and platform B is transformed to the camera field of view (CFOV) reference frame. This can be accomplished by multiplying the camera DCM($t_{Fi}$) (camera DCM calculated for captured frame at time $t_{Fi}$) by the vector distance between the platforms at the same time frame. The result of this multiplication is the vector distance in the CFOV reference frame. This calculation can be mathematically expressed for example as shown in section C in annex 1 below. The distance between platform A and platform B in the CFOV frame can be calculated, for example, by unit 17 (e.g. by relative position transformation module 29).

It is assumed that there is an error in the result of the previous calculation due to the GNSS and/or INS navigation error and error in gimbal angles. At block 319 rectified distance (relative position) values in the camera Y and Z axes are calculated. To this end, the absolute values of the relative position in the CFOV reference frame are multiplied by the CLOS unit vector components ($u_Y$, $u_Z$). This calculation can be mathematically expressed for example as shown in section D in annex 1 below. This calculation is performed for each one of Y and Z axes. This can be calculated for example by unit 17 (e.g. by rectified distance calculator 33).

Notably, in some examples it may be desired to correct the error of the calculated attitude values (e.g. camera DCM with respect to ECEF). In such cases the operations described above with reference to blocks 315 to 319 can be performed as part of the attitude error determination process, as explained below with reference to FIG. 5.

At block 321 relative position error values in the Y and Z axes in the FPA of the camera, are calculated. This is done by calculating the difference between the relative position, obtained from positioning devices (block 317) and rectified relative position components calculated in the previous stage (block 319). The error calculation in the Y and Z axes can be calculated for example by unit 17, e.g. by navigation errors calculator 35. This calculation can be mathematically expressed as shown in section E in annex 1 below.

Notably, the Y and Z distance components are more accurate than the corresponding components calculated-based navigation data obtained from the positioning devices, and can be therefore used to improve the miss-distance accuracy, where CLOS data is unavailable, as shown below.

As explained above, error values are calculated in the Y and Z axis with respect to a certain image $t_{Fi}$. Calculated errors for respective captured image $t_{Fi}$ can be stored in the computer storage 5.

According to some examples, calculation of the navigation error values as described above can be performed in real-time while platform A is approaching platform B. According to other examples, the navigation error values are not calculated in real-time. Rather, various data components gathered during the preceding operations (including those described above with reference to FIG. 3a) are stored in data-storage (with reference to a respective frame) and can be used later on for calculating the navigation error and corrected miss-distance.

According to one example, the process of calculating a navigation error is initiated (e.g. by navigation error processing unit 17) when platform A is located at a certain distance (which can be predefined) from platform B. The number of times the calculation of a navigation error value is performed can vary depending on the specific implementation and preferences. According to one example, calculation of the navigation error can be done only once, to obtain a single value. According to other examples, calculation of the navigation error can be performed several times (in some examples, for each captured frame, in which case the rate of calculation depends in general on the camera frame rate) providing navigation error values for each time. The final relative position error values can be calculated, based on all or part of the calculated values (e.g. using some type of statistical calculation, such as average or median values).

The process of calculating navigation errors can be terminated (e.g. by navigation error processing unit 17) when platform A is located at a certain distance (which can be predefined) from platform B. In any case, the process of calculating navigation errors can continue as long as the camera provides imaging data of platform B of a sufficient quality. As platform A moves closer to platform B, the camera field of view is shifted away from platform B until platform B is completely out of frame or until the obtained imaging data is not of sufficient quality. Likewise, image quality degradation can result from smearing of the target image as a result of gimbals limitation. At this point the errors in the Y and Z axes can no longer be calculated because imaging data from the camera is no longer available (or is available in insufficient quality).

At block 323 it is determined whether or not one or more conditions for terminating the process of calculating navigation errors are fulfilled. According to one example, a termination condition is defined, based on the number of frames for which a navigation error is to be calculated, and the calculation is terminated once the relevant number of calculations has been achieved. According to another example, a termination condition can be defined as a certain distance between platform A and platform B. According to yet another example, a termination condition can be an image quality (e.g. of platform B) threshold (defined by an image processor,) where the process is terminated if the quality of the captured frames is below that threshold.

In the event that one or more predefined termination conditions are not fulfilled, the operations described with respect to FIGS. 3a and 3b are performed with respect to another frame (the process is repeated according to FIG. 3a with respect to the next frame). Otherwise, in the event that the one or more predefined termination conditions are fulfilled, the process proceeds to block 325 where final navigation errors are determined.

Notably, in the event that the error determination process is a real-time process, the operations described with respect to block 323 can be executed after execution of the operations described with reference to FIG. 3a. As explained above, further calculation can be performed offline.

Final navigation error can be determined in various ways including for example, one of: selecting specific navigation error values from a collection of calculated navigation error values; calculating average navigation error values from a collection of calculated navigation error values; based on the angle between velocity vector at the miss-distance time and X axis of CFOV; or simply taking the calculated navigation error values, if only one set of values is available.

For example, navigation error processing unit 17 can be configured to determine whether the one or more predefined termination conditions are fulfilled or not. According to one non limiting example, a certain image quality threshold can be defined and navigation error processing unit 17 can be configured to use the captured images for calculating a navigation error until the image quality of the captured image falls below that threshold. To this end, navigation error processing unit 17 can comprise an image processor configured to determine whether or not platform B is visible in the CFOV and/or whether the quality of the image of platform B has sufficient image quality (e.g. if the image of platform B is located near the FOV margin, the image is not used).

The resulting navigation error values (see block 321 above) can be used for correcting the miss-distance values calculated, based on navigational data obtained from positioning devices onboard the platforms.

At some point the navigation error values calculation process terminates and platform A continues to advance towards platform B until the miss-distance occurs (time $t_I$). It is assumed that the navigation error values do not change significantly during the time period starting from the time the navigation error calculations terminate ($t_F$) and until the time of the miss-distance time ($t_I$) occurs. This is so, since the positioning devices onboard platform A and platform B normally do not develop a significant error during the time periods similar to that which is expected to elapse between $t_F$ and $t_I$.

Figure 4:
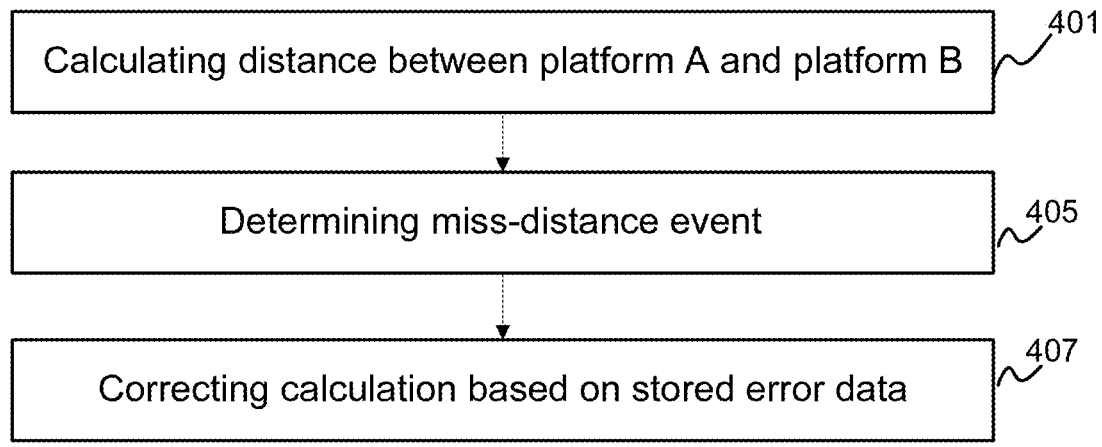
FIG. 4 is flowchart illustrating operations related to a miss-distance correction process, in accordance with an example of the presently disclosed subject matter.

FIG. 4 is a flowchart illustrating operations related to the miss-distance correction process, in accordance with an example of the presently disclosed subject matter. As noted above with respect to calculation of the errors, likewise, correction of miss-distance can be calculated real-time while platform A is approaching platform B or at some other time, using stored information recorded during the interception process.

Starting from the time the calculation of the navigations error values terminate ($t_F$) the relative position (distance) of the two platforms is continuously calculated as explained above with reference to blocks 301, 303, 311, 313 and block 315 (block 401). This calculation can be repeated until, for example, the relative position between the platforms is determined to be constantly increasing.

The miss-distance event is determined (block 405) for example, by identifying the shortest distance from among the calculated distances between the platforms. This calculation can be mathematically expressed for example as shown in section H in annex 1 below. The miss-distance can be determined for example by unit 17 (e.g. by miss-distance determination module 35).

At block 407 the miss-distance between platform A and platform B is corrected using the calculated navigation error value. As explained above, as the navigation and gimbal angle errors during the time interval (between $t_F$ and $t_I$) are approximately constant, the navigation error values, calculated at the time $t_F$ may be used at the time $t_I$.

This calculation can be mathematically expressed for example as shown in section H and I in annex 1 below. This can be accomplished for example by unit 17 (e.g. by miss-distance correction module 39).

As mentioned above the system and method disclosed herein can be alternatively used for maintaining a minimal distance between platform A and platform B in order to avoid impact. To this end, once the navigation error values are available (see block 321 above; in some examples after termination of the error calculation process is determined (block 323)) the calculated errors can be used for correcting the miss-distance values, based on navigational data obtained from positioning devices onboard the platforms. The resulting distance between the platforms can then be compared to a predefined minimal distance between the platform. If the calculated distance is smaller (or equal) than the allowed minimal distance, maneuvering instructions can be generated (e.g. by computer 20) for controlling a flight guiding subsystem of at least one of the platform directing the platform away from the other platform in order to avoid impact. This process occurs in real-time during flight of the platform. Such process can be used for example for allowing platforms to fly by other platform in close proximity while reducing the risk of impact due to the accurate determination of relative position.

As mentioned above, in some systems it may be desired to correct the error of the calculated attitude (e.g. camera DCM with respect to ECEF) values. Errors in attitude values result from navigation system errors and gimbal angle errors. Such operations may not be necessary if the onboard navigation system and gimbals system provide sufficiently accurate data.

In general, as the attitude calculated by some systems is not as accurate as it may be desired, attitude correction can be used during the navigation error correction process. The attitude correction process is executed before the operations described with reference to FIG. 4. Once the attitude errors are available, they can be used for correction of the miss-distance, calculated from the navigation data.

Figure 5:
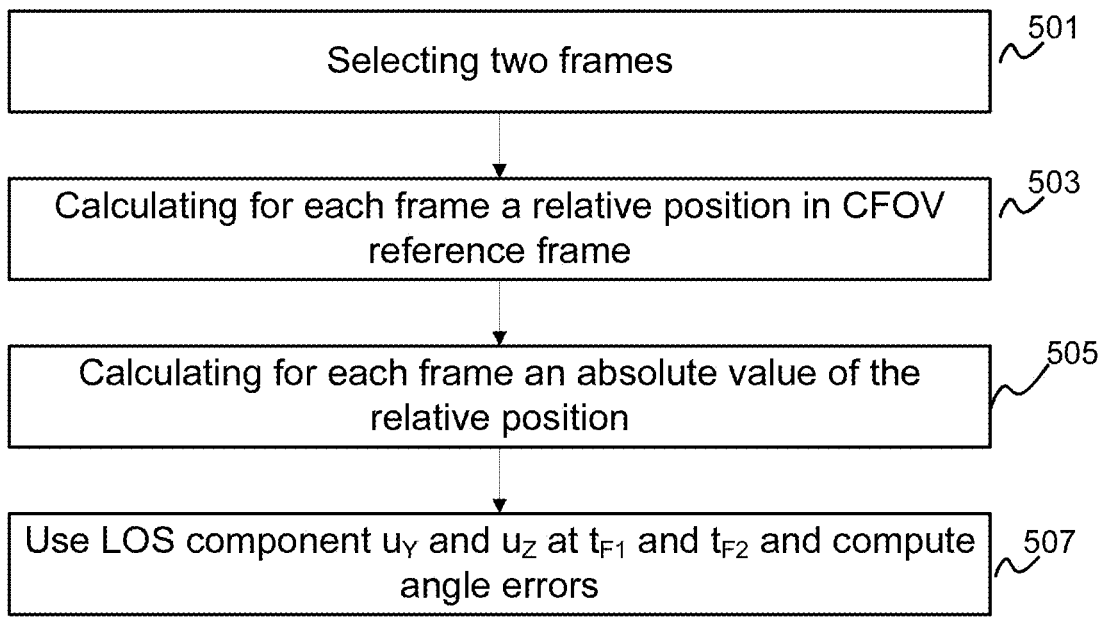
FIG. 5 is a flowchart illustrating operations related to an attitude error calculation process, in accordance with an example of the presently disclosed subject matter.

Turning to FIG. 5, this is a flowchart illustrating operations related to the attitude error determination process, in accordance with an example of the presently disclosed subject matter. During this process the attitude error resulting from the navigation attitude error of platform A with respect to ECEF and from the gimbals angle errors, is calculated. Operations described with reference to FIG. 5 can be executed for example by unit 17 (e.g. by attitude error calculator 41).

At block 501, two frames from the sequence of frames captured by the camera (15) are obtained. A first frame has a first time stamp $t_{F1}$ and the second has a second time stamp $t_{F2}$.

At block 503 for each one of the two frames operations described above with reference to FIG. 3b blocks 315 and 317 are performed to determine relative position in the CFOV reference frame for each of the first frame and second frame.

At block 505 the absolute values of the relative position in the CFOV reference frame for each frame are multiplied by the camera LOS vector components measured by the camera (see block 319 above).

The respective camera LOS components $u_y$ and $u_z$ calculated of each one of the first and second frames, i.e. having the time stamp $t_{F1}$ and $t_{F2}$, respectively, are used to compute the attitude angle errors.

At block 507 the angle errors values can be calculated, based on the difference between the distance values calculated for each of the first frame and the second frame. This calculation can be mathematically expressed for example as shown in section F in annex 1 below. The angle error values ($\delta\psi$, $\delta\vartheta$) can be used for calculation of distance component errors (see for example as shown in section H in annex 1 below).

Optionally, the operations described with reference to FIG. 5 can be repeated multiple times, each time with different pairs of images. The final attitude error values can be calculated, based on the collection of attitude error values determined for each pair of images (e.g. average or median values).

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable non-transitory memory tangibly embodying a program of instructions executable by the machine for executing the method of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

Herein below there is provided in annex 1 mathematical representation of various operations described above.

ANNEX 1

1. Definitions

Target and Interceptor Navigation Data Definitions

Target data (from Target navigation system):

$\vec{Pos}_{Target}^{ECEF}$—position in ECEF frame $\vec{Vel}_{Target}^{ECEF}$—velocity in ECEF frame Interceptor Navigation Data (from Interceptor Navigation System):

$\vec{P}os_{Interceptor}^{ECEF}$—position in ECEF frame
$\vec{V}el_{Interceptor}^{ECEF}$—velocity in ECEF frame
$C_{ECEF}^{body}$—DCM of Body frame relative to ECEF frame Interceptor CAMERA Data Definitions
Interceptor Gimbal Data:
$C_{Body}^{CFOV}$—DCM of CFOV frame relative to Body frame (camera orientation relative to Body) $\vec{u}=[u_X, u_Y, u_Z]$—Interceptor CAMERA LOS vector
$C_{ECEF}^{CFOV'}$—Estimated ECEF to CFOV direction cosine matrix (notice that navigation data also is involved in the DCM calculation)

Relative Data Definitions

Target-Interceptor Relative Position and Velocity:

$\vec{R}_{Nav}^{ECEF}$—relative position in ECEF frame
$\vec{V}_{Nav}^{ECEF}$—relative velocity in ECEF frame
$\vec{R}_{Nav}^{CFOV}$—relative position in CFOV frame
$\vec{V}_{Nav}^{CFOV}$—relative velocity in CFOV frame Notice that in accordance with the above definitions:

$$\vec{R}_{Nav}^{ECEF} = [R_{Nav\,X}^{ECEF}, R_{Nav\,Y}^{ECEF}, R_{Nav\,Z}^{ECEF}]$$
$$\vec{R}_{Nav}^{CFOV} = [R_{Nav\,X}^{CFOV}, R_{Nav\,Y}^{CFOV}, R_{Nav\,Z}^{CFOV}]$$

Notice that the distance vector $\vec{R}_{Nav}^{CFOV}$ and unit vector $\vec{u}$ are collinear in absence of navigation errors.

Time Definitions

Image Time Tag (Time of the LOS Data Measurement):
$t_F$—image time tag, $t_{F_n}$—nth image time tag
Virtual Interceptor Time:
$t_I$—time of the virtual interception
Target Interceptor Relative Position Propagation (Distance Increment) Definitions
Distance Increment in ECEF Frame from Time $t_1$ to Time $t_2$:

$$\vec{R}_{Nav}^{ECEF} \big|_{t_1}^{t_2} = \vec{R}_{Nav}^{ECEF}(t_2) - \vec{R}_{Nav}^{ECEF}(t_1) = [R_{Nav\,X}^{ECEF}\big|_{t_1}^{t_2},$$
$$R_{Nav\,Y}^{ECEF}\big|_{t_1}^{t_2}, R_{Nav\,Z}^{ECEF}\big|_{t_1}^{t_2}] = [R_{Nav\,X}^{ECEF}(t_2) - R_{Nav\,X}^{ECEF}(t_1),$$
$$R_{Nav\,Y}^{ECEF}(t_2) - R_{Nav\,Y}^{ECEF}(t_1), R_{Nav\,Z}^{ECEF}(t_2) - R_{Nav\,Z}^{ECEF}(t_1)]$$

Distance Increment in CFOV Frame from Time $t_1$ to Time $t_2$:

$$\vec{R}_{Nav}^{CFOV} \big|_{t_1}^{t_2} = \vec{R}_{Nav}^{CFOV}(t_2) - \vec{R}_{Nav}^{CFOV}(t_1) = [R_{Nav\,X}^{CFOV}\big|_{t_1}^{t_2},$$
$$R_{Nav\,Y}^{CFOV}\big|_{t_1}^{t_2}, R_{Nav\,Z}^{CFOV}\big|_{t_1}^{t_2}] = [R_{Nav\,X}^{CFOV}(t_2) - R_{Nav\,X}^{CFOV}(t_1),$$
$$R_{Nav\,Y}^{CFOV}(t_2) - R_{Nav\,Y}^{CFOV}(t_1), R_{Nav\,Z}^{CFOV}(t_2) - R_{Nav\,Z}^{CFOV}(t_1)]$$

Notice that the distance increment is computed from navigation systems data, corrupted by navigation errors.

FPA Measurements Definitions

Distance components in the FPA at time $t_F$ calculated from the relative position data in CFOV frame and CAMERA data:
$R_{NavCam\,Y}^{CFOV}(t_F)$—Y-component
$R_{NavCam\,Z}^{CFOV}(t_F)$—Z-component These components are more accurate than relative range components obtained from the navigation system, and are therefore used to estimate the miss distance.

Throughout the rest of the document, the components will be alternatively called rectified distance components.

Corrected distance components in the FPA of the CFOV at the time $t_I$:
$Y_{cor}(t_I)$—Y-component
$Z_{cor}(t_I)$—Z-component Navigation and CAMERA Error Definitions The estimate of the navigation relative position error in the ECEF frame: $\delta \vec{R}_{Nav}^{ECEF}$ Errors of the Y and Z-components of the distance vector in FPA plane at the time of frame $t_F$:

$$\delta R_{Nav\,Y}^{CFOV}(t_F) = R_{Nav\,Y}^{CFOV}(t_F) - R_{NavCam\,Y}^{CFOV}(t_F)$$

$$\delta R_{Nav\,Z}^{CFOV}(t_F) = R_{Nav\,Z}^{CFOV}(t_F) - R_{NavCam\,Z}^{CFOV}(t_F)$$

Figure 6:
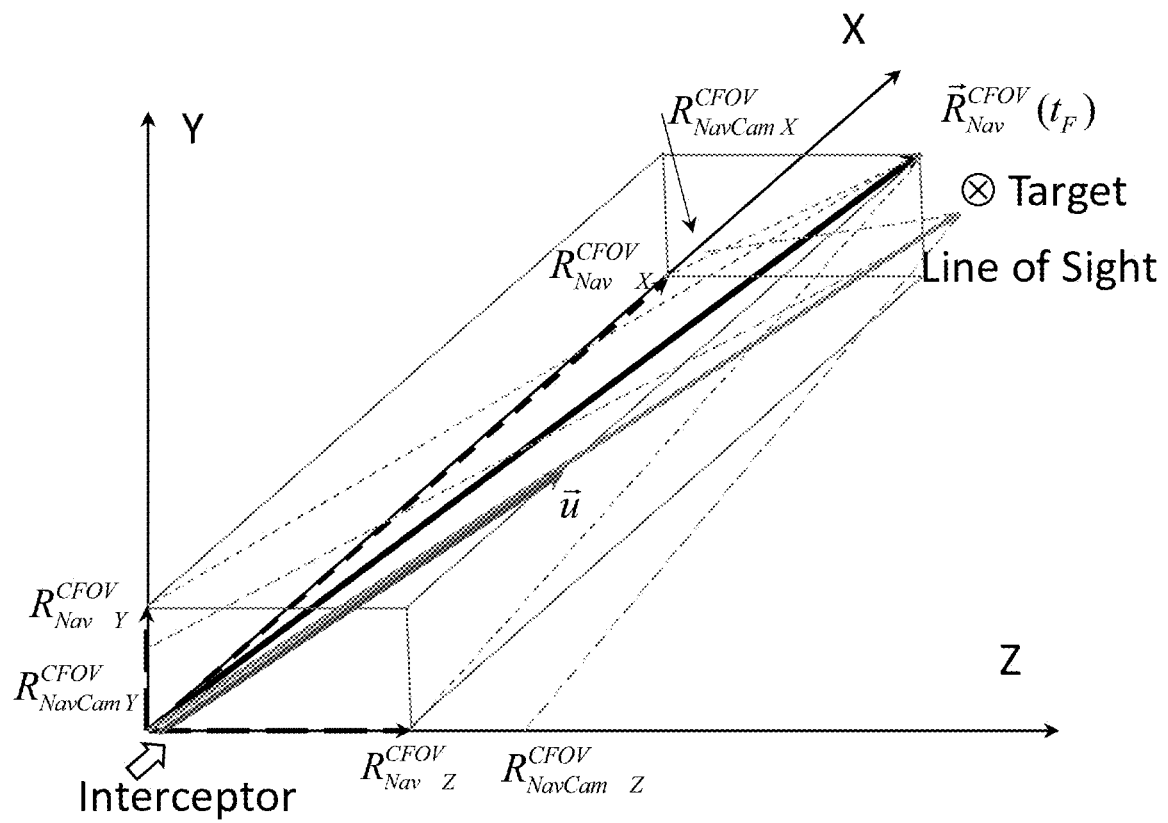
FIG. 6 shows relative position in a CFOV frame, in accordance with an example of the presently disclosed subject matter.

$\delta C_{ECEF}^{CFOV}$—Estimated ECEF to CFOV direction cosine matrix error
$\delta \psi$—Z CFOV angular error
$\delta \vartheta$—Y CFOV angular error
$\delta \varphi$—X CFOV angular error Relative position in a CFOV frame is illustrated in FIG. 6.

2. Detailed Description of the Algorithm

A. Calculation of the relative position vector between interceptor and target and relative velocity vector in the ECEF frame at the time of image t:

$$\vec{R}_{Nav}^{ECEF}(t) = \vec{P}os_{Target}^{ECEF}(t) - \vec{P}os_{Interceptor}^{ECEF}(t) \quad (1)$$

$$\vec{V}_{Nav}^{ECEF}(t) = \vec{V}el_{Target}^{ECEF}(t) - \vec{V}el_{Interceptor}^{ECEF}(t) \quad (1a)$$

B. Calculation of the direction cosine matrix ECEF to CFOV at the time of image t:

$$C_{ECEF}^{CFOV}(t) = C_{Body}^{CFOV}(t) \cdot C_{ECEF}^{Body}(t)$$

C. Calculation of the distance vector between interceptor and target and relative velocity in the CFOV frame at the time of image t:

$$R_{Nav}^{CFOV}(t) = C_{ECEF}^{CFOV}(t) \cdot \vec{R}_{Nav}^{ECEF}(t) \quad (2)$$

$$\vec{V}_{Nav}^{CFOV}(t) = C_{ECEF}^{CFOV}(t) \cdot \vec{V}_{Nav}^{ECEF}(t) \quad (2a)$$

These calculations are inaccurate due to the erroneous position, velocity and angles. Once again the latter is affected by both the navigation errors and camera and gimbal errors. Therefore the errors need to be rectified.

D. Calculation of the rectified distance components at the time of image t.

From the following vector definition $$\vec{R}_{NavCam}^{CFOV}(t) = |\vec{R}_{Nav}^{CFOV}(t)| \cdot \vec{u}(t)$$

the rectified Y and Z-components of the distance, using Navigation and CAMERA data, are calculated as follows:

$$R_{NavCam\ Y}^{CFOV}(t) = |\vec{R}_{Nav}^{CFOV}(t)| \cdot u_Y(t)$$

$$R_{NavCam\ Z}^{CFOV}(t) = |\vec{R}_{Nav}^{CFOV}(t)| \cdot u_Z(t) \quad (3)$$

Notice that the LOS angles are very accurate and their values are small. Thus, the Y and Z-distance components are more accurate than the corresponding components calculated-based navigation data (see 2) and may be used to improve the distance accuracy at the interceptor point, where LOS data is unavailable.

E. Calculation of the estimated distance components errors in the FPA plane at the time of image t:

$$\delta R_{Nav\ Y}^{CFOV}(t) = R_{Nav\ Y}^{CFOV}(t) - R_{NavCam\ Y}^{CFOV}(t)$$
$$= R_{Nav\ Y}^{CFOV}(t) - |\vec{R}_{Nav}^{CFOV}(t)| \cdot u_Y(t)$$

$$\delta R_{Nav\ Z}^{CFOV}(t) = R_{Nav\ Z}^{CFOV}(t) - R_{NavCam\ Z}^{CFOV}(t)$$
$$= R_{Nav\ Z}^{CFOV}(t) - |\vec{R}_{Nav}^{CFOV}(t)| \cdot u_Z(t) \quad (4)$$

The calculated errors can be used for calculation of the interceptor point relative coordinates in the FPA plane at the time $t = t_I$, where the CAMERA data is unavailable, as is mentioned above. Recall that the navigation errors during the time interval (between time $t = t_F$ and time $t = t_I$) are approximately constant. Thus, the correction terms which are calculated at the time $t = t_F$ may be used at the time $t = t_I$. It is assumed that the angle between the relative velocity vector at the time $t = t_F$ and the CFOV X-axis, is small.

Notice that the navigation and gimbal angular errors may reduce the accuracy of the rectified distance components, and, as a result, the accuracy of the correction terms. The calculation and compensation algorithm of the errors are described in the following paragraphs. The above formulas are used for two images time tags $t = t_{F_1}$ and $t = t_{F_2}$.

F. Attitude error estimation

The attitude error of the navigation solution can be estimated using two successive images before interceptor. Analysis of dependence of distance error in the CFOV frame with respect to attitude errors, is performed below. The analysis results are used in the following paragraph to compensate the corresponding distance errors.

Calculation of the relative target-interceptor distance propagation (increment) from the time $t = t_{F_1}$ to the time $t = t_{F_2}$:

$$\vec{R}_{Nav}^{CFOV}\bigg|_{t_{F_1}}^{t_{F_2}} = \vec{R}_{Nav}^{CFOV}(t_{F_2}) - \vec{R}_{Nav}^{CFOV}(t_{F_1}) =$$

$$C_{ECEF}^{CFOV}(t_{F_2})\vec{R}_{Nav}^{ECEF}(t_{F_2}) - C_{ECEF}^{CFOV}(t_{F_1})\vec{R}_{Nav}^{ECEF}(t_{F_1}) =$$

$$C_{ECEF}^{CFOV}(t_{F_1})C_{ECEF(t_{F_2})}^{ECEF(t_{F_1})}\vec{R}_{Nav}^{ECEF}(t_{F_2}) - C_{ECEF}^{CFOV}(t_{F_1})\vec{R}_{Nav}^{ECEF}(t_{F_1})$$

Notice that:

$$C_{ECEF}^{ECEF(t_{F_1})} \approx I \quad (5)$$

$$C_{ECEF}^{CFOV}(t) = C_{ECEF(t)}^{CFOV} \text{ by definition}$$

Thus:

$$\vec{R}_{Nav}^{CFOV}\bigg|_{t_{F_1}}^{t_{F_2}} \approx C_{ECEF}^{CFOV}(t_{F_1})(\vec{R}_{Nav}^{ECEF}(t_{F_2}) - \vec{R}_{Nav}^{ECEF}(t_{F_1})) =$$

$$C_{ECEF}^{CFOV}(t_{F_1})\vec{R}_{Nav}^{ECEF}\bigg|_{t_{F_1}}^{t_{F_2}}$$

Error of the relative target-interceptor distance propagation (increment) during time interval between $t_{F_1}$ and $t_{F_2}$ may be represented as follows:

$$\delta\left(\vec{R}_{Nav}^{CFOV}\bigg|_{t_{F_1}}^{t_{F_2}}\right) = \delta\left(C_{ECEF}^{CFOV}(t_{F_1})\vec{R}_{Nav}^{ECEF}\bigg|_{t_{F_1}}^{t_{F_2}}\right) = \quad (6)$$

$$\delta C_{ECEF}^{CFOV}(t_{F_1}) \cdot \vec{R}_{Nav}^{ECEF}\bigg|_{t_{F_1}}^{t_{F_2}} + C_{ECEF}^{CFOV}(t_{F_1}) \cdot \delta\vec{R}_{Nav}^{ECEF}\bigg|_{t_{F_1}}^{t_{F_2}}$$

The first term $$\delta C_{ECEF}^{CFOV}(t_{F_1}) \cdot \vec{R}_{Nav}^{ECEF}\bigg|_{t_{F_1}}^{t_{F_2}}$$

is DCM error contribution to the error, while the second term $$C_{ECEF}^{CFOV}(t_{F_1})\delta\vec{R}_{Nav}^{ECEF}\bigg|_{t_{F_1}}^{t_{F_2}} \approx \vec{0}$$

is the interceptor navigation relative target position error contribution.

The second term can be neglected. Indeed, time interval between $t_{F_1}$ and $t_{F_2}$ is expected to be no more than a few seconds. Assuming that inertial system is accurate and during that interval GPS position updates are prevented, navigation error $\delta\vec{R}_{Nav}^{ECEF}(t)$ is almost constant and its change can be disregarded. Thus:

$$C_{ECEF}^{CFOV}(t_{F_1}) \cdot \delta\vec{R}_{Nav}^{ECEF}\bigg|_{t_{F_1}}^{t_{F_2}} \approx \vec{0}$$

Analyze the first term:

$$\delta C_{ECEF}^{CFOV}(t_{F_1}) \cdot \vec{R}_{Nav}^{ECEF}\bigg|_{t_{F_1}}^{t_{F_2}} = (C_{ECEF}^{CFOV^*}(t_{F_1}) - C_{ECEF}^{CFOV}(t_{F_1})) \cdot \vec{R}_{Nav}^{ECEF}\bigg|_{t_{F_1}}^{t_{F_2}} = \quad (7)$$

$$(C_{CFOV}^{CFOV^*}(t_{F_1}) \cdot C_{ECEF}^{CFOV}(t_{F_1}) - C_{ECEF}^{CFOV}(t_{F_1})) \cdot \vec{R}_{Nav}^{ECEF}\bigg|_{t_{F_1}}^{t_{F_2}}$$

$$(C_{CFOV}^{CFOV^*}(t_{F_1}) - I) \cdot C_{ECEF}^{CFOV}(t_{F_1}) \cdot \vec{R}_{Nav}^{ECEF}\bigg|_{t_{F_1}}^{t_{F_2}} =$$

-continued $$\begin{pmatrix} 0 & \delta\psi & -\delta\theta \\ -\delta\psi & 0 & \delta\phi \\ \delta\theta & -\delta\phi & 0 \end{pmatrix} \cdot \vec{R}_{Nav}^{CFOy}\Big|_{t_{F_1}}^{t_{F_2}}$$

Rewrite the result of the above analysis:

$$\delta \vec{R}_{Nav}^{CFOV}\Big|_{t_{F_1}}^{t_{F_2}} = \begin{pmatrix} 0 & \delta\psi & -\delta\theta \\ -\delta\psi & 0 & \delta\phi \\ \delta\theta & -\delta\phi & 0 \end{pmatrix} \cdot \vec{R}_{Nav}^{CFOV}\Big|_{t_{F_1}}^{t_{F_2}} \quad (8)$$

Alternatively:

$$\delta R_{Nav\ x}^{CFOV}\Big|_{t_{F_1}}^{t_{F_2}} = \delta\psi \cdot R_{Nav\ y}^{CFOV}\Big|_{t_{F_1}}^{t_{F_2}} - \delta\vartheta \cdot R_{Nav\ z}^{CFOV}\Big|_{t_{F_1}}^{t_{F_2}} \quad (9)$$

$$\delta R_{Nav\ y}^{CFOV}\Big|_{t_{F_1}}^{t_{F_2}} = -\delta\psi \cdot R_{Nav\ x}^{CFOV}\Big|_{t_{F_1}}^{t_{F_2}} + \delta\varphi \cdot R_{Nav\ z}^{CFOV}\Big|_{t_{F_1}}^{t_{F_2}}$$

$$\delta R_{Nav\ z}^{CFOV}\Big|_{t_{F_1}}^{t_{F_2}} = \delta\vartheta \cdot R_{Nav\ x}^{CFOV}\Big|_{t_{F_1}}^{t_{F_2}} - \delta\varphi \cdot R_{Nav\ y}^{CFOV}\Big|_{t_{F_1}}^{t_{F_2}}$$

Recall that $R_{Nav\ z}^{CFOV}\Big|_{t_{F_1}}^{t_{F_2}} \ll R_{Nav\ x}^{CFOV}\Big|_{t_{F_1}}^{t_{F_2}}$ and $R_{Nav\ y}^{CFOV}\Big|_{t_{F_1}}^{t_{F_2}} \ll R_{Nav\ x}^{CFOV}\Big|_{t_{F_1}}^{t_{F_2}}$ $\delta R_{Nav\ y}^{CFOV}\Big|_{t_{F_1}}^{t_{F_2}} \approx -\delta\psi \cdot R_{Nav\ x}^{CFOV}\Big|_{t_{F_1}}^{t_{F_2}}$ $\delta R_{Nav\ z}^{CFOV}\Big|_{t_{F_1}}^{t_{F_2}} \approx \delta\vartheta \cdot R_{Nav\ x}^{CFOV}\Big|_{t_{F_1}}^{t_{F_2}}$ Explicitly (using sign "=" instead of sign "≈"):

$$\delta R_{Nav\ y}^{CFOV}(t_{F_2}) - \delta R_{Nav\ y}^{CFOV}(t_{F_1}) = -\delta\psi \cdot (R_{Nav\ x}^{CFOV}(t_{F_2}) - R_{Nav\ x}^{CFOV}(t_{F_1}))$$

$$\delta R_{Nav\ z}^{CFOV}(t_{F_2}) - \delta R_{Nav\ z}^{CFOV}(t_{F_1}) = -\delta\vartheta \cdot (R_{Nav\ x}^{CFOV}(t_{F_2}) - R_{Nav\ x}^{CFOV}(t_{F_1})) \quad (10)$$

The tilt components $\delta\psi$, $\delta\vartheta$ are dependent upon the gimbal angles and the navigation attitude errors, respectively. These errors are assumed to be relatively constant. Indeed, the encoders (also known as "rotary encoders") errors evolution is negligible if the CAMERA rotation is small. At the times $t_{F_1}$, $t_{F_2}$, and $t_F$ the CAMERA rotation is indeed small.

Notice that the times $t_{F_1}$ and $t_{F_2}$ must be different but one of them may be equal to the time $t_F$.

Rewrite the equations (4) for the times $t_{F_1}$, $t_{F_2}$:

$$\delta R_{Nav\ y}^{CFOV}(t_{F_2}) = R_{Nav\ y}^{CFOV}(t_{F_2}) - |\vec{R}_{Nav}^{CFOV}(t_{F_2})| \cdot u_y(t_{F_2})$$

$$\delta R_{Nav\ y}^{CFOV}(t_{F_1}) = R_{Nav\ y}^{CFOV}(t_{F_1}) - |\vec{R}_{Nav}^{CFOV}(t_{F_1})| \cdot u_y(t_{F_1})$$

$$\delta R_{Nav\ z}^{CFOV}(t_{F_2}) = R_{Nav\ z}^{CFOV}(t_{F_2}) - |\vec{R}_{Nav}^{CFOV}(t_{F_2})| \cdot u_z(t_{F_2})$$

$$\delta R_{Nav\ z}^{CFOV}(t_{F_1}) = R_{Nav\ z}^{CFOV}(t_{F_1}) - |\vec{R}_{Nav}^{CFOV}(t_{F_1})| \cdot u_z(t_{F_1}) \quad (11)$$

Applying the errors from (11) in the equation (10) yields:

$$\left( R_{Nav\ y}^{CFOV}(t) - |\vec{R}_{Nav}^{CFOV}(t)| \cdot u_y(t) \right) \quad (12)$$

$$\Big|_{t_{F_1}}^{t_{F_2}} = -\delta\psi \cdot (R_{Nav\ x}^{CFOV})(t)\Big|_{t_{F_1}}^{t_{F_2}}$$

$$\left( R_{Nav\ z}^{CFOV}(t) - |\vec{R}_{Nav}^{CFOV}(t)| \cdot u_z(t) \right)\Big|_{t_{F_1}}^{t_{F_2}} = \delta\vartheta \cdot (R_{Nav\ x}^{CFOV})(t)\Big|_{t_{F_1}}^{t_{F_2}}$$

Now $\delta\psi$ and $\delta\vartheta$ may be calculated as follows:

$$\delta\psi = -\frac{\left( R_{Nav\ y}^{CFOV}(t) - |\vec{R}_{Nav}^{CFOV}(t)| \cdot u_y(t) \right)\Big|_{t_{F_1}}^{t_{F_2}}}{R_{Nav\ x}^{CFOV}(t)\Big|_{t_{F_1}}^{t_{F_2}}} \quad (13)$$

$$\delta\vartheta = \frac{\left( R_{Nav\ z}^{CFOV}(t) - |\vec{R}_{Nav}^{CFOV}(t)| \cdot u_z(t) \right)\Big|_{t_{F_1}}^{t_{F_2}}}{R_{Nav\ x}^{CFOV}(t)\Big|_{t_{F_1}}^{t_{F_2}}}$$

Notice that the attitude errors may be calculated for several images and a sanity test may be performed. In one example, an average value of the attitude errors may be used to diminish contribution of the noise. In order to apply the aforementioned corrections at the interceptor point, the time $t_I$ is to be calculated.

G. Detection of the interceptor time $t_I$.

At the interceptor point the relative distance is minimal and scalar multiplication of relative velocity vector and relative position vector is zero. Thus, the value of $|\vec{R}_{Nav}^{CFOV}(t)|$ is minimal and value of $\vec{R}_{Nav}^{CFOV}(t) \cdot \vec{V}_{Nav}^{CFOV}(t)$ changes its sign at the time $t_I$.

The time of interceptor may be defined, based on the above conditions.

H. Calculation of FPA distance component errors at the virtual interceptor time $t_I$.

Recall that the image for the distance correction is taken at the time $t_F$.

Applying the equation (10) for times $t_F$ and $t_I$ gives:

$$\delta R_{Nav\ Y}^{CFOV}(t_I) = \delta R_{Nav\ Y}^{CFOV}(t_F) - \delta\psi \cdot (R_{Nav\ x}^{CFOV}(t_I) - R_{Nav\ x}^{CFOV}(t_F))$$

$$\delta R_{Nav\ Z}^{CFOV}(t_I) = \delta R_{Nav\ Z}^{CFOV}(t_F) + \delta\vartheta \cdot (R_{Nav\ x}^{CFOV}(t_I) - R_{Nav\ x}^{CFOV}(t_F)) \quad (14)$$

Substitution of (4) in (14) gives:

$$\delta R_{Nav\ Y}^{CFOV}(t_I) = R_{Nav\ Y}^{CFOV}(t_F) - |\vec{R}_{Nav}^{CFOV}(t_F)| \cdot u_Y(t_F) - \delta\psi \cdot (R_{Nav\ x}^{CFOV}(t_I) - R_{Nav\ x}^{CFOV}(t_F))$$

$$\delta R_{Nav\ Z}^{CFOV}(t_I) = R_{Nav\ Z}^{CFOV}(t_F) - |\vec{R}_{Nav}^{CFOV}(t_F)| \cdot u_Z(t_F) + \delta\vartheta \cdot (R_{Nav\ x}^{CFOV}(t_I) - R_{Nav\ x}^{CFOV}(t_F)) \quad (15)$$

I. Calculation of corrected FPA distance components at the interceptor time $t_I$.

From (15) the corrected FPA distance components $Y_{cor}$ and $Z_{cor}$ are calculated:

$$Y_{cor} = R_{Nav\ y}^{CFOV}(t_I) = \delta R_{Nav\ Y}^{CFOV}(t_I)$$

$$Z_{cor} = R_{Nav\ z}^{CFOV}(t_I) = \delta R_{Nav\ Z}^{CFOV}(t_I)$$

The invention claimed is:

1. A computer implemented method of determining miss-distance between an intercepting platform and a target platform, the intercepting platform being launched towards the target platform and comprising at least one positioning device, a clock onboard the intercepting platform being synchronized with a clock onboard the target platform the method comprising executing, by a processor:

for at least one image captured at a time $t_{TFi}$ during flight of the intercepting platform towards the target platform, by an electro-optic sensor fixed to the target platform:

calculating relative position of the intercepting platform and the target platform, based on navigation data of the intercepting platform determined by the at least one positioning device and navigation data of the target platform;

transforming the relative position to electro-optic sensor field of view (CFOV) reference frame;

calculating rectified relative position values in an electro-optic sensor plane, based on electro-optic sensor data;

calculating relative position error values in the electro-optic sensor plane, based on a difference between the relative position and rectified relative position values;

determining the relative position of the intercepting platform and target platform at miss-distance time; and correcting the relative position at miss-distance time using the relative position error values.

2. The method according to claim 1, wherein the electro-optic sensor data used for calculating the rectified relative position values includes the relative position of the intercepting platform in the electro-optic sensor field of view reference frame and electro-optic sensor line of sight (CLOS) unit vector components.

3. The method of claim 1 further comprising:

for each captured image at time $t_{Tfi}$:

determining navigation data of the intercepting platform;

determining attitude of the electro-optic sensor, in a reference frame of the target platform;

applying image processing on the captured image for determining electro-optic sensor line of sight (CLOS); and transforming relative position to the CFOV reference frame.

4. The method of claim 1 further comprising:

calculating respective relative position error values for each one of multiple images captured during flight of the intercepting platform towards the target platform, wherein each respective relative position error value is associated with a certain captured image.

5. The method of claim 4 further comprising:

calculating final position error values based on the respective relative position error values.

6. The method of claim 1 further comprising an attitude errors determining process, comprising:

selecting a first image at time $t_{TF1}$ and a second image at time $t_{TF2}$; and for each one of the first image and second image:

determining relative position in the CFOV reference frame;

calculating rectified relative position values in Y and Z axes of the electro-optic sensor plane; and using electro-optic sensor line of sight (CLOS) component $u_y$ and $u_Z$ at $t_{TF1}$ and $t_{TF2}$ to compute angle errors.

7. The method of claim 2 further comprising an attitude errors determining process, comprising:

selecting a first image at time $t_{TF1}$ and a second image at time $t_{TF2}$; and for each one of the first image and second image:

determining relative position in the CFOV reference frame;

calculating rectified relative position values in Y and Z axes of the electro-optic sensor plane; and using electro-optic sensor line of sight (CLOS) component $u_y$ and $u_z$ at $t_{F1}$ and $t_{TF2}$ to compute angle errors.

8. The method of claim 1 further comprising:

for at least one image captured at a time $t_{IFi}$, during flight of the intercepting platform towards the target platform, by a second electro-optic sensor fixed to the intercepting platform:

transforming the relative position to a second CFOV reference frame;

calculating second rectified relative position values in a second electro-optic sensor plane, based on second electro-optic sensor data; and calculating second relative position error values in the second electro-optic sensor plane, based on a difference between a second relative position and second rectified relative position values; and correcting the relative position at miss-distance time using the second relative position error values instead or in addition to the relative position error values.

9. The method of claim 8, wherein the second electro-optic sensor data used for calculating the second rectified relative position values includes the relative position of the intercepting platform in the second CFOV reference frame and second electro-optic sensor line of sight (CLOS) unit vector components.

10. The method of claim 8 further comprises:

for each captured image at time $t_{Ifi}$ by the second electro-optic sensor:

determining second navigation data of the intercepting platform;

calculating second attitude of the second electro-optic sensor in a reference frame of the intercepting platform;

applying image processing on the captured image for determining second electro-optic sensor line of sight (CLOS); and transforming the second relative position to the second CFOV reference frame.

11. The method of claim 9 further comprises:

for each captured image at time $t_{IFi}$ by the second electro-optic sensor:

determining second navigation data of the intercepting platform;

calculating second attitude of the second electro-optic sensor in a reference frame of the intercepting platform;

applying image processing on the captured image for determining second electro-optic sensor line of sight (CLOS); and transforming the second relative position to the second CFOV reference frame.

12. The method of claim 8 further comprises:

calculating second respective relative position error values for each one of multiple images captured during flight of the intercepting platform towards the target platform, wherein each second respective relative position error value is associated with a certain captured image.

13. The method of claim 12 further comprising:

calculating second final position error values based on the second respective relative position error values.

14. The method of claim 8 further comprising a second attitude errors determining process, comprising:

selecting a first image at time $t_{IF1}$ and a second image at time $t_{IF2}$ captured by the second electro-optic sensor; and for each one of the first image and second image:
  determining relative position in the CFOV reference frame;
  calculating rectified relative position values in Y and Z axes of the electro-optic sensor plane; and
  using electro-optic sensor line of sight (CLOS) component $u_Y$ and $u_z$ at $t_{IF1}$ and $t_{IF2}$ to compute angle errors.

15. A computerized device configured for determining miss-distance between an intercepting platform and a target platform, wherein a clock onboard the intercepting platform is synchronized with clock onboard the target platform; the intercepting platform is configured to be launched towards the target platform and comprises at least one positioning device; the computerized device comprising at least one processor configured to:
  i. execute a navigation errors calculation process, comprising:
    for at least one image captured at a time $t_{TFi}$ during flight of the intercepting platform towards the target platform, by an electro-optic sensor fixed to the target platform:
    calculate relative position of the intercepting platform and the target platform, based on navigation data of the intercepting platform determined by the at least one positioning device and navigation data of the target platform;
    transform the relative position to electro-optic sensor field of view (CFOV) reference frame;
    calculate rectified relative position values in an electro-optic sensor plane of the electro-optic sensor, based on electro-optic sensor data; and
    calculate relative position error values in the electro-optic sensor plane, based on a difference between the relative position and rectified relative position values;
  ii. execute a navigation miss-distance correction process, comprising:
    determine the relative position of the intercepting platform and target platform at miss-distance time; and
    correct the relative position at miss-distance time using the relative position error values.

16. The computerized device of claim 15, wherein the electro-optic sensor data used for calculating the rectified relative position values includes the relative position of the intercepting platform in the electro-optic sensor field of view reference frame and electro-optic sensor line of sight (CLOS) unit vector components.

17. The computerized device of claim 15, wherein the at least one processor is further configured, for executing the navigation errors calculation process, to:
  for each captured image at time $t_{TFi}$:
    determine navigation data of the intercepting platform;
    calculate attitude of the electro-optic sensor, onboard the intercepting platform, in a reference frame of the intercepting platform;
    operate an image processor to process the captured image for determining electro-optic sensor line of sight (CLOS); and
    transform relative position to the CFOV reference frame.

18. The computerized device of claim 15, wherein the at least one processor is further configured, for executing the navigation errors calculation process, to:
  receive multiple images captured during flight of the intercepting platform toward the target platform, each image is associated with a respective time $t_{TFi}$ and
  calculate a respective relative position error value for each one of the multiple images.

19. The computerized device of claim 18, wherein the at least one processor is further configured to:
  calculate final position error values based on the respective relative position error values.

20. The computerized device of claim 15, wherein the at least one processor is further configured to execute an attitude errors determining process, comprising:
  selecting a first image at time $t_{TF1}$ and a second image at time $t_{TF2}$; and
  for each one of the first image and second image:
    determining relative position in the CFOV reference frame;
    calculating rectified relative position values in Y and Z axes of the electro-optic sensor plane; and
    using electro-optic sensor line of sight (CLOS) component $u_Y$ and $u_Z$ at $t_{TF1}$ and $t_{TF2}$ to compute angle errors.

21. The computerized device of claim 15 being installed on any one of:
  the intercepting platform; a control station configured for monitoring the intercepting platform; and the target platform.

22. A system for determining miss-distance between an intercepting platform and a target platform; the system comprising an intercepting platform and a target platform, the intercepting platform is configured to be launched towards the target platform and comprises at least one positioning device and a first electro-optic sensor, the target platform comprises a second electro-optic sensor, wherein a clock onboard the intercepting platform is synchronized with a clock onboard the target platform; the system further comprises at least one computerized device configured to:
  execute a first navigation errors calculation process based on images captured by the first electro-optic sensor giving rise to first relative position error values, comprising:
    for at least one image captured by the first electro-optic sensor at a time $t_{IFi}$, during flight of the intercepting platform towards the target platform:
      calculate relative position of the intercepting platform and the target platform, based on navigation data of the intercepting platform determined by the at least one positioning device and navigation data of the target platform;
      transform the relative position to a first electro-optic sensor field of view (CFOV) reference frame of the first electro-optic sensor;
      calculate rectified relative position values in a first electro-optic sensor plane of the first electro-optic sensor, based on first electro-optic sensor data; and
      calculate the first relative position error values in the first electro-optic sensor plane, based on a difference between the relative position and rectified relative position values; and
  execute a second navigation errors calculation process based on images captured by the second electro-optic sensor giving rise to second relative position error values, comprising:
    for at least one image captured by the second electro-optic sensor at a time $t_{TFi}$ during flight of the intercepting platform towards the target platform:

calculate relative position of the intercepting platform and the target platform, based on navigation data of the intercepting platform determined by the at least one positioning device and navigation data of the target platform;
transform the relative position to a second CFOV reference frame of the second electro-optic sensor;
calculate rectified relative position values in a second electro-optic sensor plane of the second electro-optic sensor, based on second electro-optic sensor data; and
calculate the second relative position error values in the second electro-optic sensor plane, based on a difference between the relative position and rectified relative position values;
determine the relative position of the intercepting platform and target platform at miss-distance time; and
correct the relative position at miss-distance time using the first relative position error values and the second relative position error values.

23. The system of claim 22, wherein the first electro-optic sensor data includes the relative position of the intercepting platform in first electro-optic sensor field of view reference frame, and first electro-optic sensor line of sight (CLOS) unit vector components; and
the second electro-optic sensor data includes the relative position of the platform in second electro-optic sensor field of view reference frame, and second CLOS unit vector components.

24. A non-transitory program storage device readable by a computer, tangibly embodying a program of instructions executable by the computer to perform a method of determining miss-distance between an intercepting platform and a target platform; the method comprising:
i. executing a navigation errors calculation process, comprising:
for at least one image captured by an electro-optic sensor fixed to the intercepting platform or the target platform at a time $t_{TFi}$ during flight of the intercepting platform towards the target platform:
calculating relative position of the intercepting platform and the target platform, based on navigation data of the intercepting platform determined by the at least one positioning device and navigation data of the target platform;
transforming the relative position to electro-optic sensor field of view (CFOV) reference frame;
calculating rectified relative position values in electro-optic sensor plane, based on electro-optic sensor data; and
calculating relative position error values in the electro-optic sensor plane, based on a difference between the relative position and rectified relative position values;
ii. executing a navigation miss-distance correction process, comprising:
determining the relative position of the intercepting platform and target platform at miss-distance time; and
correcting the relative position at miss-distance time using the relative position error values.

* * * * *